A. D. SHAEFFER.
TRAP.
APPLICATION FILED DEC. 4, 1911.

1,041,520.

Patented Oct. 15, 1912.

2 SHEETS—SHEET 1.

WITNESSES
Samuel Payne.
Ralph C. Evert.

INVENTOR
A. D. Shaeffer.
BY
ATTORNEYS

A. D. SHAEFFER.
TRAP.
APPLICATION FILED DEC. 4, 1911.
1,041,520.
Patented Oct. 15, 1912.
2 SHEETS—SHEET 2.
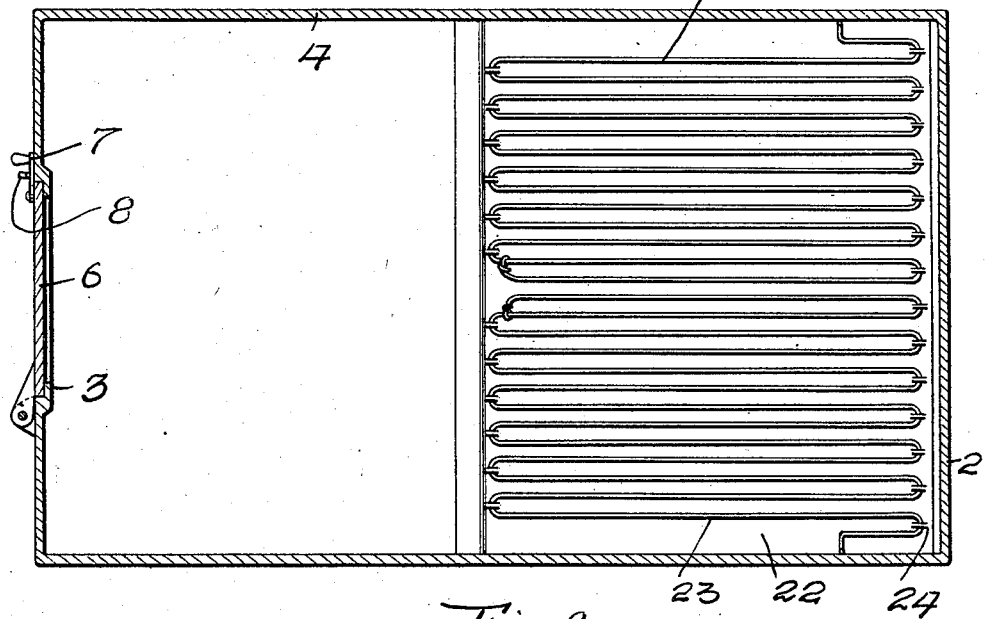
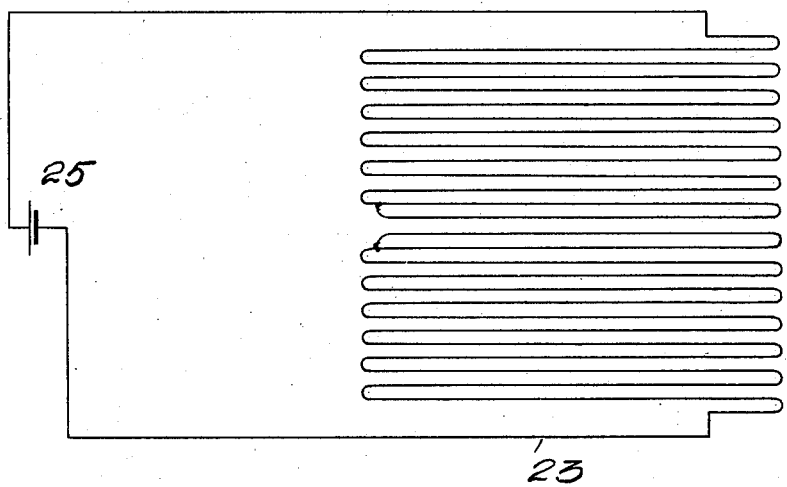
WITNESSES
Samuel Payne
Ralph C. Evert
INVENTOR
A. D. Shaeffer
BY
ATTORNEYS

UNITED STATES PATENT OFFICE.

ABSALOM D. SHAEFFER, OF KITTANNING, PENNSYLVANIA.

TRAP.

1,041,520. Specification of Letters Patent. Patented Oct. 15, 1912.

Application filed December 4, 1911. Serial No. 663,657.

*To all whom it may concern:*

Be it known that I, ABSALOM D. SHAEFFER, a citizen of the United States of America, residing at Kittanning, in the county of Armstrong and State of Pennsylvania, have invented certain new and useful Improvements in Traps, of which the following is a specification, reference being had therein to the accompanying drawing.

This invention relates to traps, and the object of my invention is to provide a trap for catching and exterminating rats and other rodents, by providing a receptacle with a novel trap door and arranging electrically charged coils of wire within the trap for electrocuting the animals precipitated therein.

My invention aims to provide a trap of the above type that can be safely used in connection with large wharfs, warehouses and other buildings infested with rats, the trap being designed whereby the rodents will be immediately electrocuted and their bodies concealed. It is constructed whereby it can be safely handled and installed without danger to other animals than those for which it is designed.

The invention will be hereinafter specifically described and then claimed, and reference will now be had to the drawings, wherein like numerals of reference designate corresponding parts throughout the several views, in which:—

Figure 1:
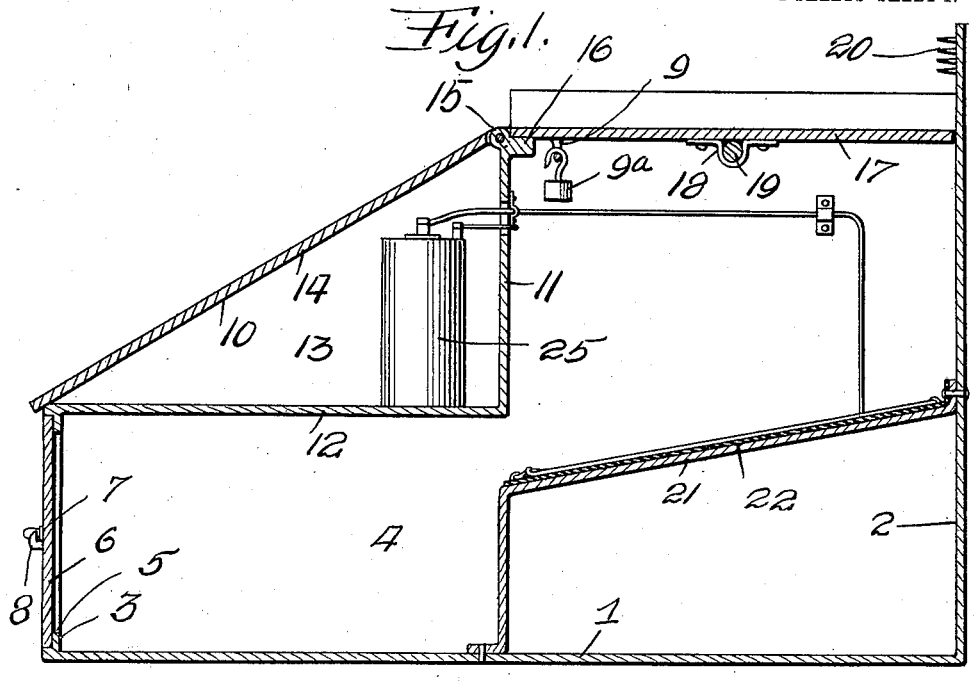
Figure 2:
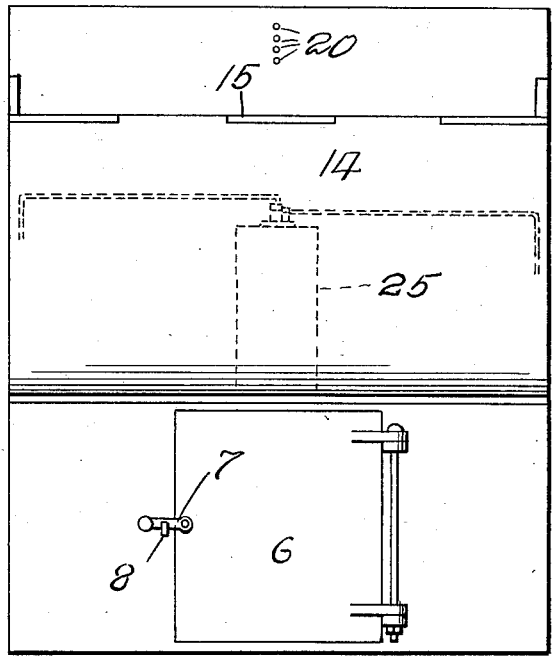

Figure 1 is a vertical longitudinal sectional view of the trap, Fig. 2 is a front elevation of the same, Fig. 3 is a horizontal sectional view of the trap, and Fig. 4 is a diagrammatic view of the wiring of the trap.

A trap in accordance with this invention comprises a bottom plate 1, a rear wall 2, a front wall 3 and side walls 4. The rear wall 2 is of a greater height than the walls 3 and 4 and the front wall 3 is provided with a doorway 5 for a hinged door 6, said door being hinged to swing outwardly and when in a closed position the door is held by a latch 7, and a keeper 8 or any other suitable fastening means.

The side walls 4 have the upper edges thereof inclined, as at 10 and said side walls are connected by a vertical partition 11 and a horizontal partition 12, these partitions providing a battery compartment 13. The battery compartment 13 is closed by a lid 14, hinged, as at 15 to the upper edge of the partition 11, said lid resting upon the inclined edges of the walls 4 and serving functionally as a gang plank leading to the top of the trap. The walls 4, adjacent to the partition 11, have the upper edges thereof connected by a transverse bar 16 and normally resting upon this bar is the forward edge of a tiltable door 17, said door having depending straps 18 loosely embracing a transverse rod 19, carried by the walls 4.

The tiltable door is arranged whereby the rear edge thereof will tilt under the weight of a rodent's body, and in order to attract a rodent to the rear edge of said door, the rear wall 2 is provided with a bait holder 20 upon which can be mounted a suitable bait, (not shown). The underneath side of the tiltable door, adjacent to the bar 16, is provided with an eye 9 and connected to said eye is a small weight $9^a$. This weight retains the tiltable door 17 normally in a horizontal closed position, and permits of the door tilting by the weight of a rodent's body.

Arranged in the trap is an inclined platform 21 preferably made of wood or other insulation material, the platform extending from a point above the lower edge of the rear wall 2 to a point below the lower edge of the partition 11. When the platform 21 is made of metal, said platform can be covered with a sheet of insulation material 22, as fiber. Arranged upon the platform 21 are two flat coils of wire 23, said coils being secured thereto by staples 24 or other fastening means. The convolutions of the coils are arranged in parallelism and close together, the end of one coil being connected to the pole of a suitable source of electrical energy 25 and the end of the other coil to the other pole of the source of electrical energy, thereby providing an open circuit that can be closed by the body of a rodent bridging the coils 23. A generator or batteries capable of producing eight hundred or more volts can be used in connection with the trap and located within the compartment 13, the battery 25 being illustrative merely of a source of electrical energy.

When a rodent is precipitated upon the coils of wire 23, the rodent is immediately electrocuted and the body rolls toward the door 6 and can be easily removed from the trap by opening said door.

What I claim is:—

A trap comprising a bottom plate, a rear wall, a front wall of a less height than said rear wall and having a doorway formed therein, a hinged door normally closing said doorway, side walls carried by said bottom plate and having the forward upper edges thereof inclined, a vertical partition connecting said side walls, a horizontal partition connecting said side walls and coöperating with said vertical partition in providing a battery compartment, a lid hinged to the upper edge of said vertical partition and adapted to rest upon the inclined edges of said side walls and close said battery compartment, a tiltable door pivotally mounted between the upper edges of said side walls, a bar connecting said side walls and normally supporting said door in a horizontal position, an inclined platform arranged in said trap and extending from said rear wall to a point below said vertical partition, wire electrodes arranged upon said platform and in circuit with the source of electrical energy located in said battery compartment, said electrodes each embodying a wire extending in open loop formation in the direction of inclination of the platform and having its free end secured to an adjacent loop, said ends being adjacent to each other substantially central of the platform, the wire of the electrode lying between such free end and the side of the trap.

In testimony whereof I affix my signature in the presence of two witnesses.

ABSALOM D. SHAEFFER.

Witnesses:
SAMUEL H. RICHARDSON,
JAMES BAKER.

Copies of this patent may be obtained for five cents each, by addressing the "Commissioner of Patents, Washington, D. C."